(12) United States Patent
Wright (10) Patent No.: US 8,317,647 B2
(45) Date of Patent: Nov. 27, 2012

(54) DRIVE UNIT

(75) Inventor: Stewart James Wright, Sanctuary Cove (AU)

(73) Assignee: Digga Australia Pty Ltd., Yatala (AU)

( * ) Notice: Subject to any disclaimer, the term of this patent is extended or adjusted under 35 U.S.C. 154(b) by 699 days.

(21) Appl. No.: 12/469,018

(22) Filed: May 20, 2009

(65) Prior Publication Data

US 2010/0298080 A1  Nov. 25, 2010

(51) Int. Cl.
*F16H 47/04* (2006.01)
(52) U.S. Cl. ......................................................... 475/31
(58) Field of Classification Search .............. 74/732.1, 74/733.1, 730.1, 731.1; 475/72, 73, 75, 77, 475/76, 78, 79, 80, 81, 83, 84; 91/509, 510, 91/533
See application file for complete search history.

(56) References Cited

U.S. PATENT DOCUMENTS

| | | | | |
|---|---|---|---|---|
| 3,262,523 A * | 7/1966 | Gordon | | 192/3.29 |
| 3,292,715 A * | 12/1966 | Balogh | | 173/177 |
| 4,264,818 A * | 4/1981 | Petersen | | 378/141 |
| 4,815,334 A * | 3/1989 | Lexen | | 74/661 |
| 7,204,779 B2 * | 4/2007 | Irikura et al. | | 475/230 |
| 8,011,910 B2 * | 9/2011 | O'Brien, II | | 418/189 |
| 2006/0217225 A1 * | 9/2006 | Hiraki et al. | | 475/72 |

* cited by examiner

*Primary Examiner* — David D Le
*Assistant Examiner* — David J Hlavka
(74) *Attorney, Agent, or Firm* — Greer, Burns & Crain, Ltd.

(57) ABSTRACT

A drive unit comprises an output shaft, two or more hydraulic motors, each hydraulic motor being adapted to drive the output shaft, and hydraulic fluid distribution means for supplying relatively high pressure hydraulic fluid to the drive motors and for removing relatively low pressure hydraulic fluid from the drive motors. The hydraulic fluid distribution means comprises a hydraulic fluid inlet for connecting to a hydraulic line to provide relatively high pressure hydraulic fluid to the two or more hydraulic motors and a hydraulic fluid outlet for removing relatively low pressure hydraulic fluid from the two or more hydraulic motors.

15 Claims, 11 Drawing Sheets

DRIVE UNIT

FIELD OF THE INVENTION

The present invention relates to a drive unit. In some embodiments, the drive unit may be used to drive augers, drilling units or indeed any other mechanical devices.

BACKGROUND TO THE INVENTION

For convenience, the background to the present invention will be described with reference to driving of augers or drilling units. However, it will be appreciated that the drive unit of the present invention may be used in applications other than driving augers or drilling units.

Augers and drilling units are used to form holes or bores in the earth or ground. Augers typically comprise a screw flight that engages with the ground. The screw flight is connected to a drive unit and the drive unit causes rotation of the screw flight. Similarly, drilling units typically comprise a drill string that is connected to a drive unit, with the drive unit causing rotation of the drill string.

Augers and drilling units may be suspended from an arm, such as the arm of a backhoe or an arm extending from a truck or other vehicle. Larger drilling units may be mounted to a special drill rig. If the augers or drilling units are suspended from an arm, swing control systems may be utilised to control pendulation of the auger or drilling unit. A suitable swing control system is one that is sold by the present applicant and described in Australian patent number 2002240700, the entire contents of which are hearing incorporated by cross-reference.

The drive units that are used to drive augers and drilling units typically include a hydraulic motor that has an output shaft. High-pressure hydraulic fluid is provided to the hydraulic motor and this causes the hydraulic motor to rotate and drive the output shaft.

Hydraulic fluid that has passed through the motor (and is at a lower pressure relative to the inlet pressure of the hydraulic fluid fed to the hydraulic motor) is removed from the hydraulic motor. The output shaft normally meshes with a gearbox reduction drive which, in turn, is connected to the auger or drilling string to thereby cause rotation of the auger or drilling string.

Hydraulic motors comprise a motor body that houses a rotor. Opposed end plates are positioned on either side of the motor body and are joined to the motor body. Hydraulic motors are well-known to person skilled in the art and examples of suitable hydraulic motors include hydraulic motors of the "geroller" type as sold by Eaton Corporation.

In order to provide high torque drive units of the type described above, it has been common practice to provide the drive units with larger hydraulic motors that have a higher torque output. However, hydraulic motors of higher torque output can become quite large and quite expensive.

There have been some attempts in the past to provide drive units that include two or more hydraulic motors. In such drive units, the output shaft of each hydraulic motor meshes with either a drive unit output shaft or with a gearing or gearbox arrangement that drives an output shaft of the drive unit. These previous attempts have required connection of the hydraulic fluid inlets and hydraulic fluid outlets of each of hydraulic motors to appropriate hydraulic lines in order to establish proper hydraulic fluid flow to and from the hydraulic motors. Consequently, a larger number of hydraulic lines are required to connect the hydraulic motors to the source of high pressure hydraulic fluid and to the low pressure hydraulic fluid drain tank. Experience has shown that hydraulic fluid lines are prone to leakage or failure and accordingly place higher maintenance levels on to those drive units. This has the potential to cause increases in maintenance costs and increases in machine downtime due to the requirement to repair hydraulic fluid lines and hydraulic fluid line connections.

The present applicant does not concede that any of the prior art discussed in this document forms part of the common general knowledge in Australia or elsewhere.

Throughout the specification, the term "comprising" and its grammatical equivalents shall be taken to have an inclusive meaning unless the context of use indicates otherwise.

BRIEF DESCRIPTION OF THE INVENTION

It is an object of the present invention to provide a drive unit that overcomes or at least ameliorates one or more of the above-mentioned disadvantages, or at least provides a commercial alternative to existing drive units.

In a first aspect, the present invention provides a drive unit comprising
    an output shaft
    two or more hydraulic motors, each hydraulic motor being adapted to drive the output shaft, and
    hydraulic fluid distribution means for supplying relatively high pressure hydraulic fluid to the drive motors and for removing relatively low pressure hydraulic fluid from the drive motors,
    wherein the hydraulic fluid distribution means comprises a hydraulic fluid inlet for connecting to a hydraulic line to provide relatively high pressure hydraulic fluid to the two or more hydraulic motors and a hydraulic fluid outlet for removing relatively low pressure hydraulic fluid from the two or more hydraulic motors.

In one embodiment, the hydraulic fluid distribution means comprises a housing having a high-pressure hydraulic fluid inlet for connection to a source of high-pressure hydraulic fluid, a low pressure hydraulic fluid outlet for connection to a hydraulic fluid outlet line, two or more high pressure hydraulic fluid outlets for connection to respective high-pressure hydraulic fluid inlets of the two or more hydraulic motors and two or more low pressure hydraulic fluid inlets for connection to respective low-pressure hydraulic fluid outlets of the two or more hydraulic motors.

In some embodiments, the housing may comprise two or more housing parts connected together. In one embodiment, the housing comprises a cross housing part having a high-pressure hydraulic fluid inlet for connection to a source of high-pressure hydraulic fluid and a low-pressure hydraulic fluid outlet for removing low-pressure hydraulic fluid that has passed through the motors from the housing, a first side housing part connected to the cross housing part, the first side housing part including at least one high-pressure hydraulic fluid outlet for connection to respective high-pressure hydraulic fluid inlets of one or more hydraulic motors and at least one low-pressure hydraulic fluid inlet for connection to respective low-pressure hydraulic fluid outlets of the one or more hydraulic motors, and a second side housing part connected to the cross housing part, the second side housing part including at least one high-pressure hydraulic fluid outlet for connection to respective high-pressure hydraulic fluid inlets of one or more hydraulic motors and at least one low-pressure hydraulic fluid inlet for connection to respective low-pressure hydraulic fluid outlets of the one or more hydraulic motors, the cross housing part including a high pressure hydraulic fluid flow path for passing high-pressure hydraulic fluid from the high-pressure hydraulic fluid inlet to the first side housing part and to the second side housing part, the cross part including a low pressure hydraulic flow path for receiving low-pressure hydraulic fluid from the first side housing part and the second side housing part. The first side housing part and the second side housing part will include a high-pressure fluid flow path for receiving high-pressure hydraulic fluid from the cross housing part and for transferring high-pressure hydraulic fluid to the high-pressure hydraulic fluid outlets. The first side housing part in the second side housing part will also include a low-pressure hydraulic fluid flow path for receiving low-pressure hydraulic fluid from the low pressure hydraulic fluid inlets and for transferring low-pressure hydraulic fluid to the cross housing part.

The side housing parts may comprise more than two side housing parts. In some embodiments, each hydraulic motor may be associated with a respective side housing part.

The fluid distribution means may be in the form of a manifold connected to a hydraulic fluid line that provides high pressure hydraulic fluid and connected to a hydraulic line that passes low pressure hydraulic fluid to a tank or reservoir. The manifold also feeds high pressure fluid to the motor inlets and removes low pressure fluid from the motor outlets.

Advantageously, the fluid distribution means has only a single high pressure inlet.

In some embodiments, the two or more hydraulic motors may comprise a motor body housing a rotor and first and second end plates, one of the end plates including the high-pressure hydraulic fluid inlet of the motor and the low-pressure hydraulic fluid outlet of the motor.

In other embodiments of the drive unit of the present invention, the fluid distribution means may be arranged such that one of the end plates of the hydraulic motors may be omitted, with the fluid distribution means providing high-pressure hydraulic fluid to the motor and removing low-pressure hydraulic fluid from the motor after the fluid has been used to drive the motor. This embodiment is particularly advantageous in that the capital costs associated with an end plate on the hydraulic motors can be avoided and the drive unit can be more compact.

The hydraulic fluid distribution means may also include valving to selectively turn off or turn on one or more of the hydraulic motors The valving may selectively control flow of hydraulic fluid to one or more of the hydraulic motors. This has the potential to allow for multispeed operation of the drive unit or to allow for multi-torque operation of the drive unit. The valving may comprise a control valve to interrupt supply of hydraulic fluid to one or more of the hydraulic motors. The control valve may cause hydraulic fluid to loop or circulate between the motor inlet and the motor outlet to thereby reduce or stop the flow of hydraulic fluid to the motor. More than one control valve may be provided.

Each of the two or more hydraulic motors included in the drive unit will have an output shaft. The output shaft of each hydraulic motor is used to drive the output shaft of the drive unit. The output shaft of each hydraulic motor may directly drive the output shaft of the drive unit. However, in most commercial embodiments, it is envisaged that the output shaft of the hydraulic motors will drive the output shaft of the drive unit via an intermediate gear or gearbox arrangement. For example, in one embodiment, the output shaft of each hydraulic motor may drive a gearing arrangement. The gearing arrangement may drive other gearing arrangements or it may drive the output shaft of the motor.

In one embodiment, the output shaft of each hydraulic motor drives a first planetary gear set. The first planetary gear set, in turn, drives a central sun gear which, in turn, drives a second planetary gear set. The second planetary gear set may drive the output shaft of the drive unit. Alternatively, further gear sets may be provided between the second planetary gear set and the drive unit output shaft.

The drive unit may also be provided with a hood cover or hood assembly that covers the drive unit to provide enhanced aesthetics and to provide protection against impact damage.

The drive unit may be provided with mounting means for mounting the drive unit to an arm. The mounting means may allow the drive unit to swing from the arm.

The drive unit may also be able to be mounted to other apparatus such as, but not limited to, crushers, conveyor systems, wheel drive systems or any suitable high torque or high power application.

The output shaft of the drive unit is adapted to be connected to whatever piece of equipment the drive unit is intended to drive. For example, the output shaft of the drive unit may be adapted to be connected to an auger or a drill string.

BRIEF DESCRIPTION OF THE DRAWINGS

FIG. 11 shows an underneath view of the fluid distribution means of the drive unit shown in FIG. 10;

FIG. 12 shows a front view of the fluid distribution means shown in FIG. 10;

FIG. 13 shows a side view of the fluid distribution means shown in FIG. 10;

FIG. 14 shows a view from the other side of the fluid distribution means shown in FIG. 10;

FIG. 16 shows a top view of the fluid distribution means shown in FIG. 10. In FIGS. 11 to 16, hidden detail of the internal structure of the fluid distribution means is shown in dotted outline.

DETAILED DESCRIPTION OF THE DRAWINGS

It will be understood that the drawings have been provided for the purposes of describing a preferred embodiment of the present invention. Therefore, it will be understood that the present invention should not be considered to be limited solely to the features as shown in the attached drawings.

Figure 1:
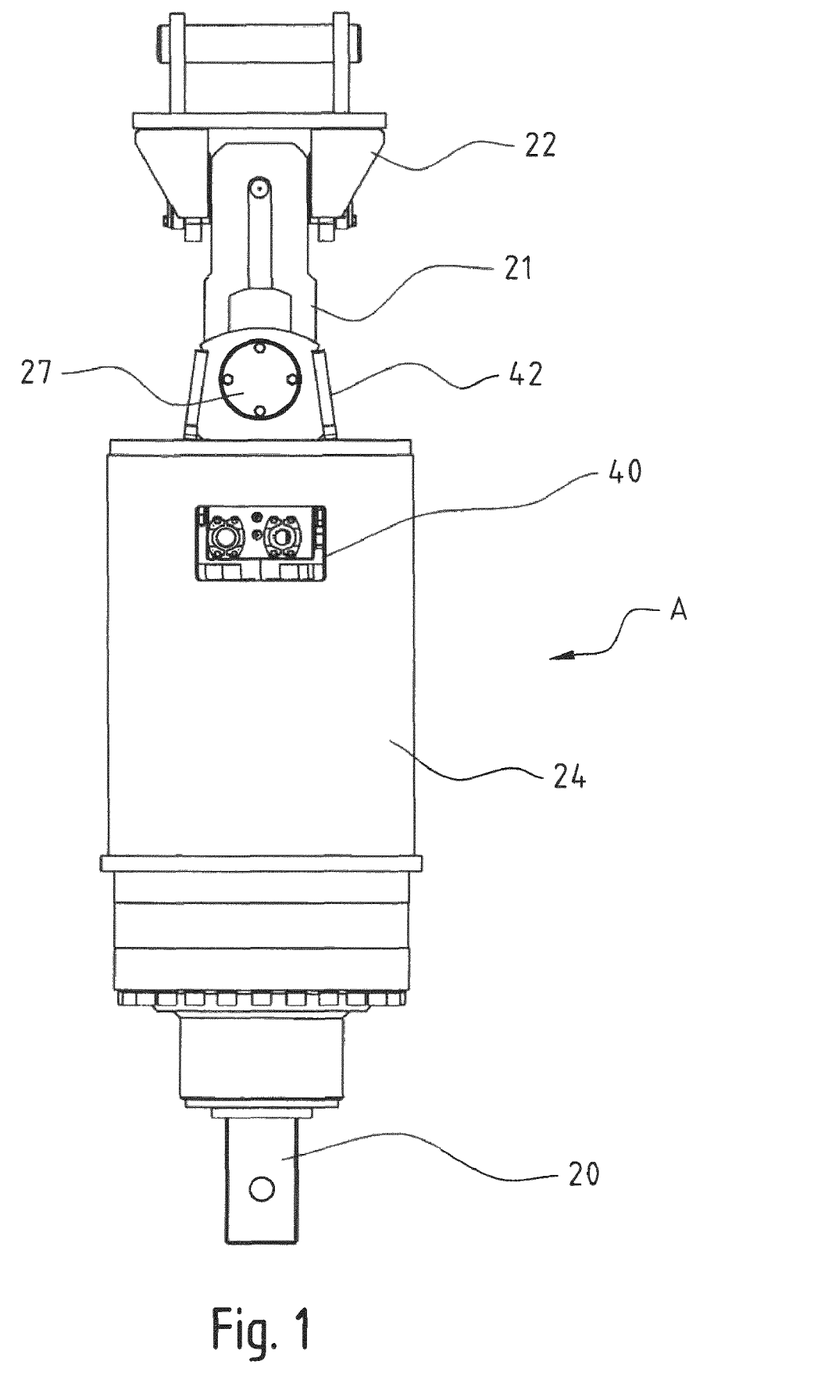
FIG. 1 shows a side view of a drive unit in accordance with an embodiment of the present invention.

The drive unit A shown in FIG. 1 has an output shaft 20 that is driven by the arrangement to be described in more detail with reference to FIGS. 2 to 9. Most of the components of the drive unit A are positioned under hood assembly 24. Hood assembly 24 provides improved aesthetics and also provides a degree of protection to the components of the drive unit against damage from impacts and minimises dust and dirt ingress into the components of the drive unit A. In addition, the hood assembly 24 provides torque holding of the drive unit A, wherein when the drive unit A is engaged, the hood assembly 24 anchors the drive unit A to the host machine to provide rotational output torque. As can be seen from FIG. 1, hood 24 has an opening 40 therein. Opening 40 allows access to the hydraulic fluid inlet and hydraulic fluid outlet of the drive unit A and thus enables hydraulic hoses to be connected to the inlet and outlet. The drive unit A also includes an upper bracket 42 that allows connection of linkage pin 27. Linkage pin 27, in turn, connects with linkage 21 which, in turn, connects via another linkage pin 27 to a hitch assembly 22. Hitch assembly 22 is typically carried by an excavator arm or a backhoe arm such that the drive unit A is suspended from the arm. As the drive unit A suspended from the arm by two linkage pins that are arranged at 90° to each other, the drive unit A is able to move through two planes. The drive unit can pendulate from the arm. Appropriate swing control system, such as that described in Australian patent number 2002240700 may also be used in conjunction with the hitch assembly to control pendulation of the drive unit A.

The output shaft 20 of the drive unit is rotatably driven. The output shaft 20 may be connected to an auger, drill string or other equipment. Operation of the drive unit causes rotation of the output shaft 20 which causes rotation of the auger, drill string or other equipment that is connected to the output shaft 20.

Figure 2:
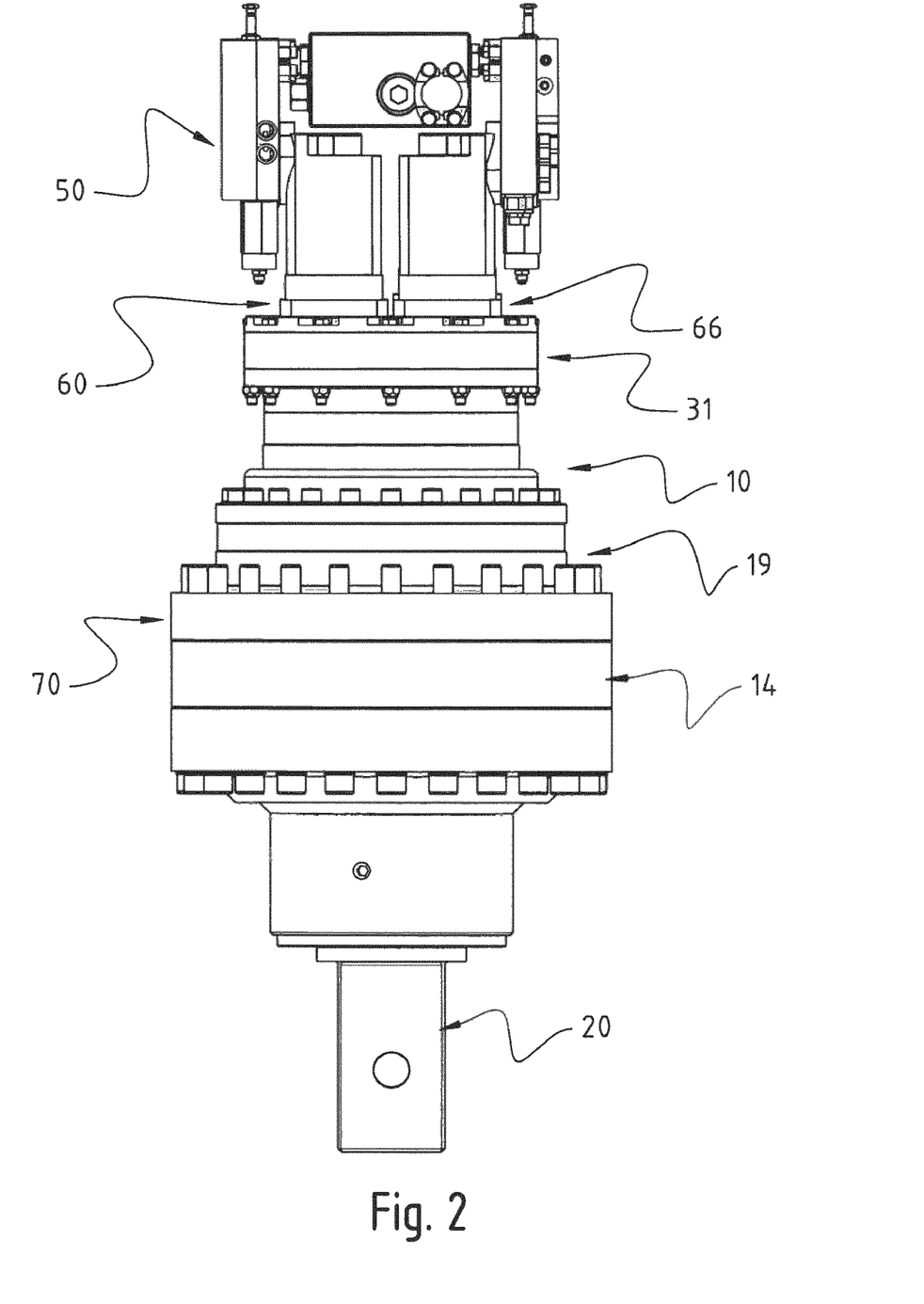
FIG. 2 shows a side view of the drive unit shown in FIG. 1, but with the hood cover and mounting means removed.
Figure 3:
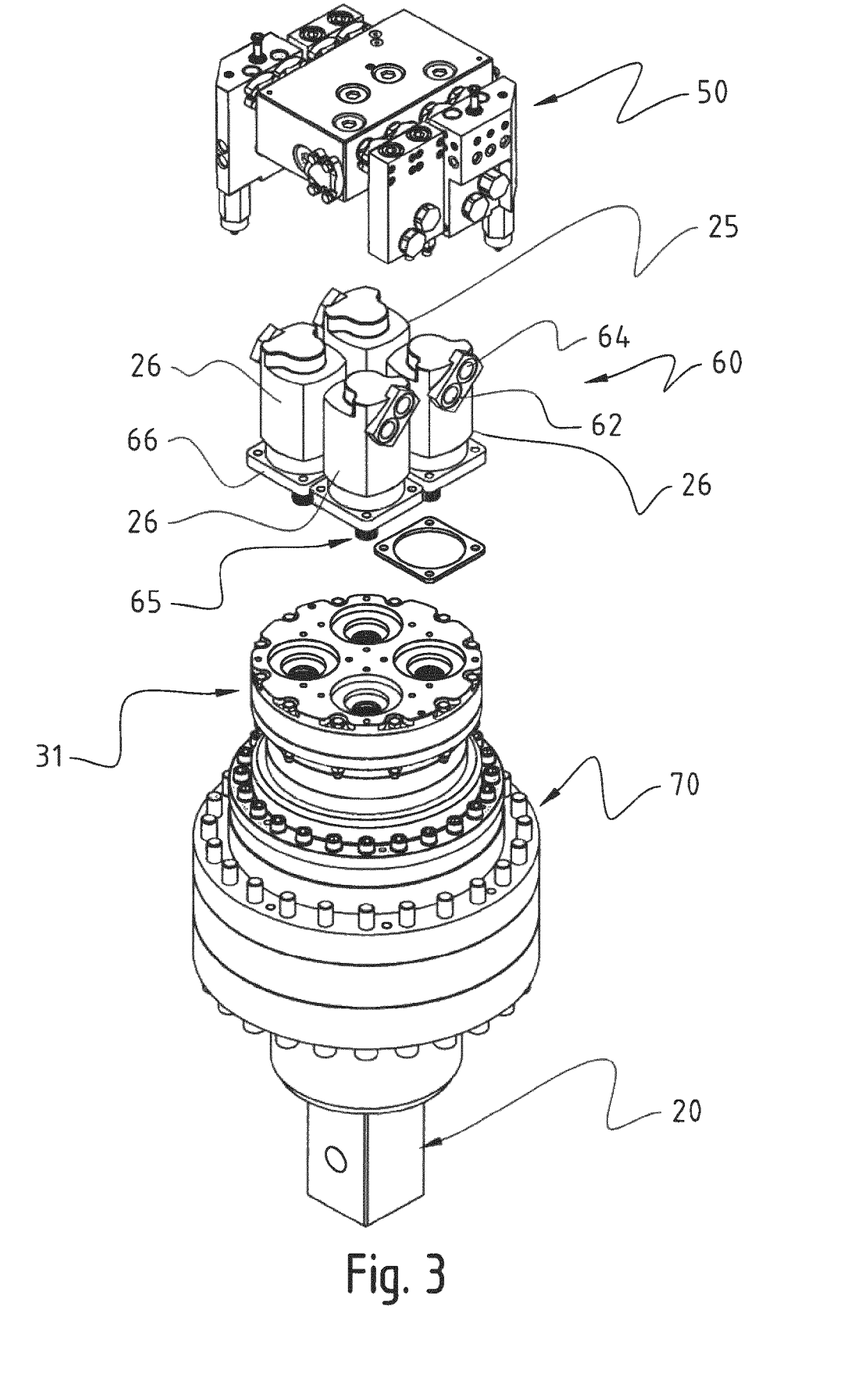
FIG. 3 shows a side view, partially apart and in line for assembly, of the drive unit shown in FIG. 2.

FIGS. 2 and 3 show the drive unit A in more detail. In particular, in FIGS. 2 and 3, the hood assembly 24 has been removed to more clearly show the components of the drive unit A. Referring initially to FIG. 3, the drive unit can be seen to comprise three main subunits, these being the hydraulic fluid distribution means 50, the hydraulic motors 60 and the gearbox/output shaft unit 70. These subunits are shown in assembled form in FIG. 2.

Dealing initially with the hydraulic motors 60, it can be seen that there are four hydraulic motors included in the drive unit A. These are denoted by reference numerals 25 and 26.

It will be appreciated that the drive unit A may have more than 4 hydraulic motors or less than 4 hydraulic motors. However, the drive unit should have a minimum of two hydraulic motors. Hydraulic motor 25 may be provided by Eaton Corporation and may, for example, be a 15CI Type 6K 17T shaft hydraulic motor. Hydraulic motor 26 may be provided by Eaton Corporation and may, for example, be a 19CI Type 6K 17T shaft hydraulic motor. Other size or capacity motors may also be used. The hydraulic motors 25, 26 are of the "geroller" type. Such hydraulic motors typically comprise a motor body that houses a rotor and the geroller set. A top end plate (in this description, the terms "top" and "bottom" and like terms are used to describe the orientation as shown in the attached figures) is attached to an upper end of the motor body. The upper end plate includes the hydraulic fluid inlet 62 and the hydraulic fluid outlet 64. A bottom end plate is attached to the lower end of the motor body. The lower end plate journals an output shaft which is typically splined or otherwise joined to the rotor. As will be understood by persons skilled in the art, hydraulic fluid at a relatively high pressure is supplied to the motor inlet. The high-pressure hydraulic fluid passes through the motor and drives a rotor which, in turn, drives an output shaft from the motor. Hydraulic fluid of a relatively lower pressure is subsequently removed from the outlet of the motor. As shown in FIG. 3, motor 26 has a high pressure hydraulic fluid inlet 62 and a low-pressure hydraulic fluid outlet 64. The output shafts of each of the hydraulic motors 25, 26 have a gear 65 splined or otherwise joined thereto in a manner that causes the gear 65 to rotate with the output shaft of the hydraulic motor.

The four hydraulic motors 25, 26 each include a lower mounting plate 66. Each of the lower mounting plates 66 are bolted to a splitter box assembly 31, which forms part of the gearbox/output shaft unit 70 (for convenience, this will hereinafter be referred to as the gearbox unit 70). The gearbox unit 70 includes reduction gear sets that are mounted in interim housing 10 and interim housing 19. A final ring gear housing 14 engages with a gear on the output shaft 20 to ultimately drive the output shaft 20. The gearbox unit 70 will be described in more detail with reference to FIG. 5.

The drive unit A also includes a fluid distribution means 50. The assembled form of the fluid distribution means is shown in greater detail in FIG. 4 and the various separate components of the fluid distribution means 50 are shown in FIGS. 6 to 9. The fluid distribution means 50 may be described as a housing or manifold arrangement that receives relatively high pressure hydraulic fluid (hereinafter referred to as "high pressurise hydraulic fluid") from a source of high pressure hydraulic fluid. The fluid distribution means then distributes the high pressure hydraulic fluid to the respective inlets 62 of the hydraulic motors 25, 26. The relatively low pressure hydraulic fluid (hereinafter referred to as "low-pressure hydraulic fluid) that is exhausted from the hydraulic motors 25, 26 via their respective fluid outlets 64 is then returned to the fluid distribution means 50 and thereafter removed from the fluid distribution means 50 via the low pressure hydraulic fluid outlet of the fluid distribution means 50.

Figure 4:
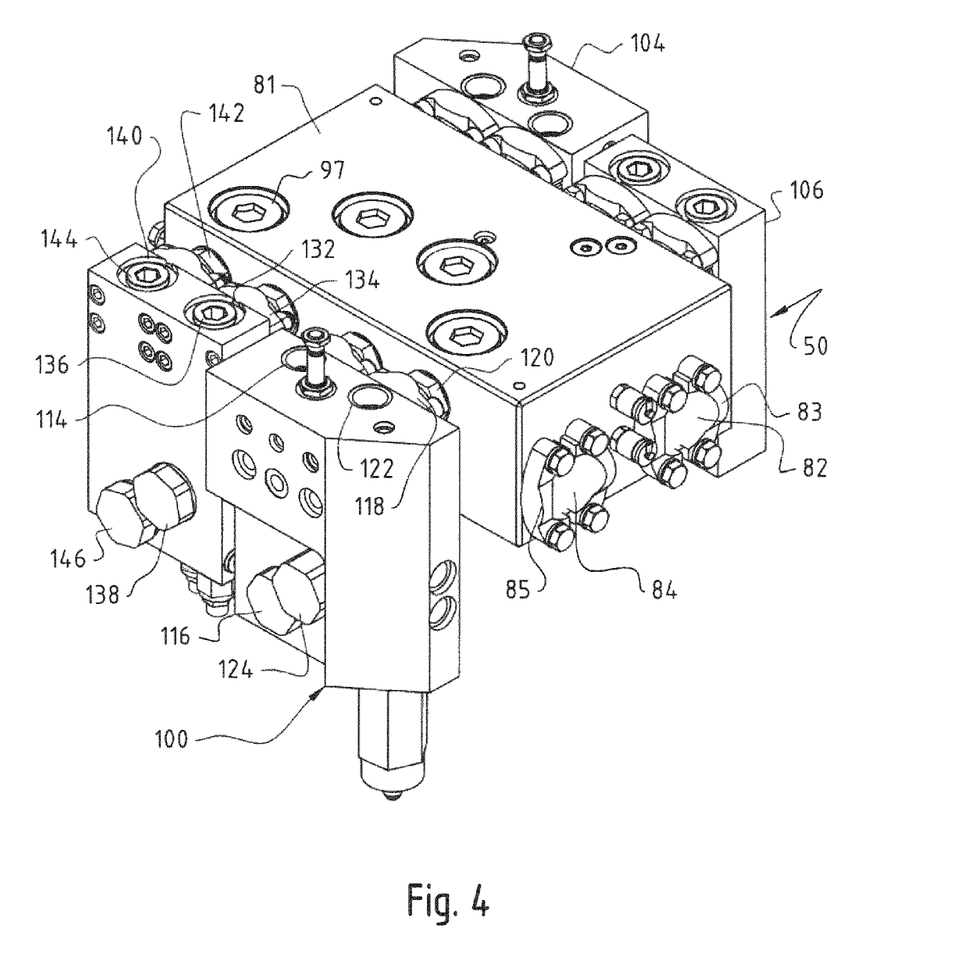
FIG. 4 shows a perspective view of the fluid distribution means used in the drive unit shown in FIGS. 2 and 3.

Referring to FIGS. 4 and 6 to 9, which show the fluid distribution means in greater detail, it can be seen from FIG. 4 that the hydraulic fluid distribution means 50 comprises a central housing or cross housing 80. Cross housing 80 (which is referred to as a "cross housing" because it is positioned such that it extends across the hydraulic motors of the drive unit A) may be made from a solid block having appropriate hydraulic fluid flow passages drilled therethrough. The cross housing 80 includes a body 81, a high-pressure hydraulic fluid inlet 82 and a low-pressure hydraulic fluid outlet 84. The inlet 82 may have an appropriate hose connector 83 mounted thereto. Similar, the outlet 84 may have an appropriate hose connector 85 mounted thereto. This enables hydraulic hoses to be easily connected to the inlet 82 and the outlet 84. The person skilled in the art will readily appreciate that a number of different hose connectors could be used.

The inlet 82 is formed by drilling a flow passage (shown in FIG. 6A by dashed lines 86) from the inlet 82 into the body of the cross housing. A cross drilling 86A connects the drilling 86 with passage 86B drilled inwardly from the other end of the housing. Appropriate cross flow passages (shown in FIG. 6A by dashed lines 87 and 88) are drilled across the body 81. The cross flow passages 87, 88 open at the sides of the body 81.

In a similar fashion, the inlet 84 is provided by drilling a passage (shown in FIG. 6A by dashed lines 89) into the body 81 of the cross housing 80. Due to the length of the passage 89, it may be formed by separate drillings made from opposed ends of the cross housing body 81. Therefore, the cross housing 80 may include a second outlet 90 having an appropriate hose connector 91 fixed thereto. Alternatively, the second opening 90 of the flow passage 89 may simply be plugged and closed. Appropriate cross flow passages 92 and 93 extend from flow passage 90. Cross flow passages 92 and 93 open at the side wall of the body 81.

Figure 6:
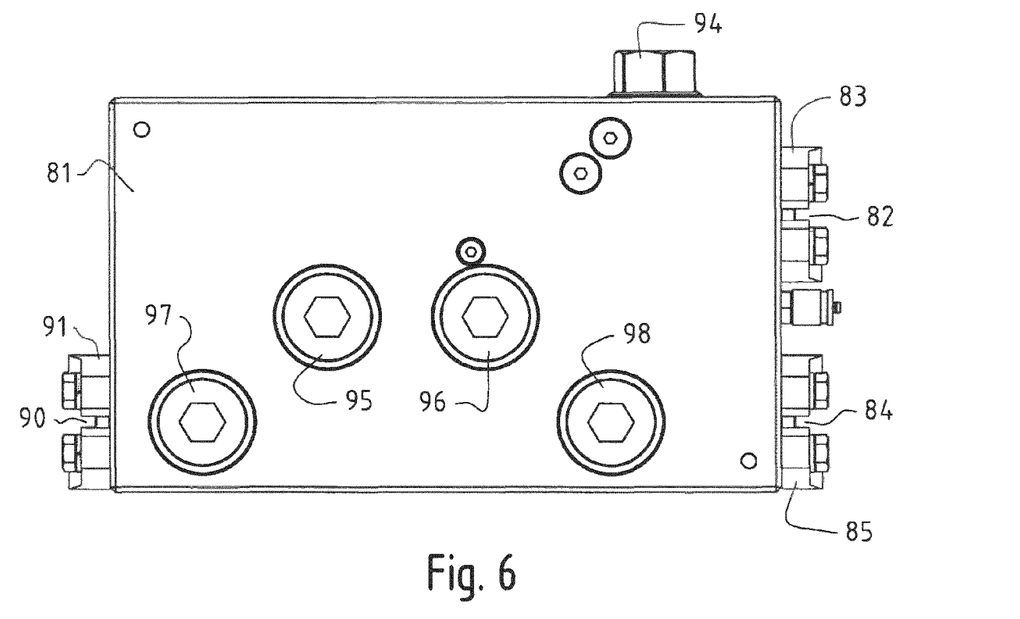
FIG. 6 shows a top view of the cross housing use in the fluid distribution means of the embodiment shown in FIGS. 1 to 5.
Figure 6A:
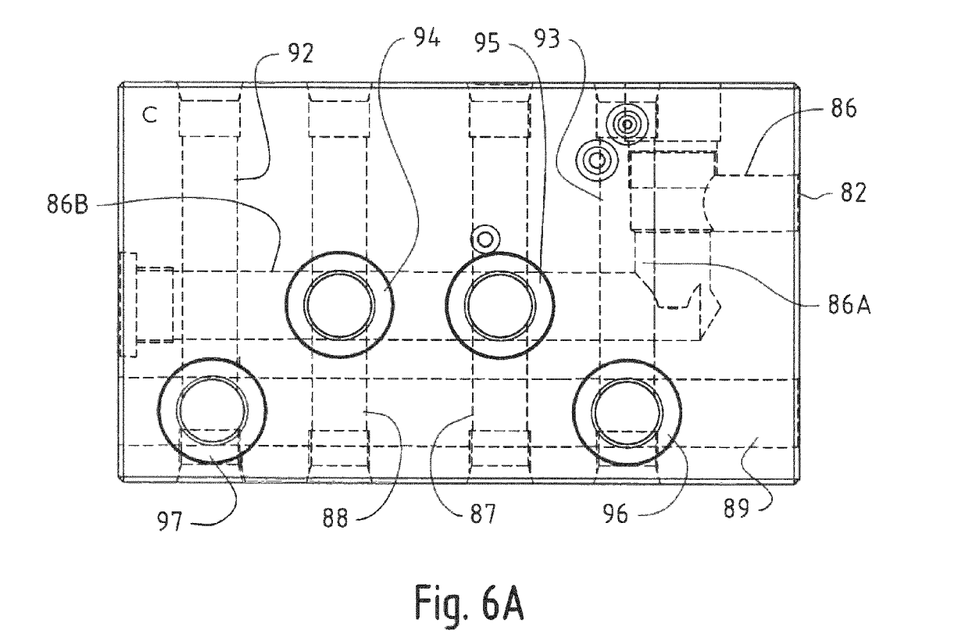
FIG. 6A shows a similar view to FIG. 6 but with the flow passages shown thereon.
Figure 7:
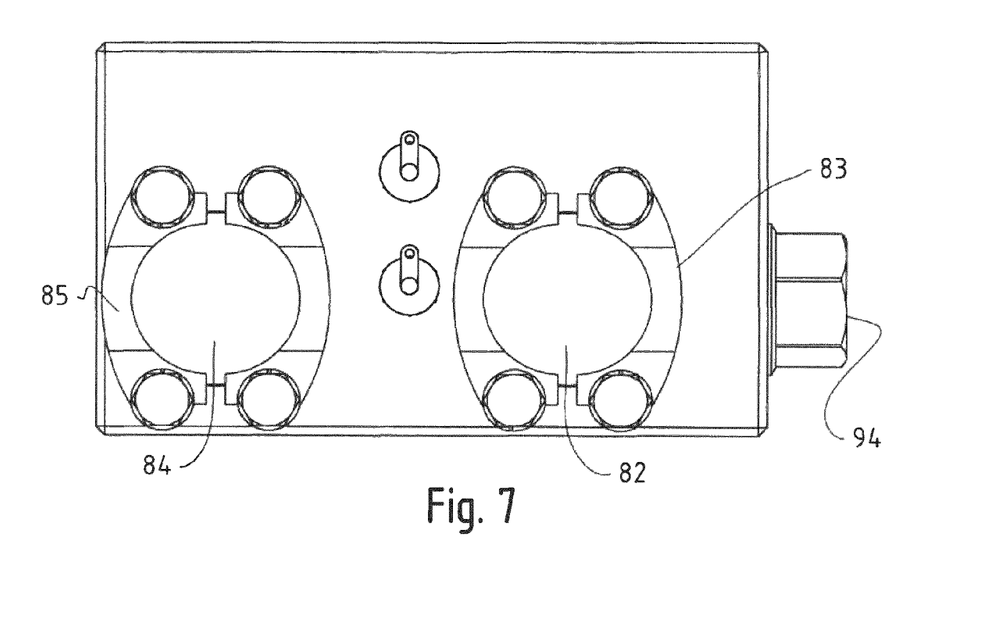
FIG. 7 is a front view of cross housing shown in FIG. 6.

In order to ensure that the high pressure cross flow passages 87, 88 do not intersect with the low-pressure cross flow passages 92, 93, the high-pressure cross flow passages are positioned at a different vertical height in the body 81 to the low pressure cross flow passages. To achieve this, vertically extending flow passages are drilled downwardly from the top of the body 81 to provide fluid connection between the longitudinal flow passages and the cross flow passages. The drillings to form the vertically extending flow passages are plugged by plugs 94, 95, 96 and 97.

The cross housing 80 also includes a cartridge valve 94. Cartridge valve 94 is provided to ensure that the hydraulic motors 25, 26 are not subjected to excessive shock in the event that the apparatus being driven by the drive unit suffers from kickback. The skilled person will understand that a number of alternative valve designs may be used to protect the hydraulic motors from shock due to kickback. Such an alternative valve design may include a screw anchor bypass valve (or swoosh valve) that may be fitted to a manifold to control the rapid induced compression of oil by the application of screw anchoring.

In order to transfer the high-pressure hydraulic fluid from the cross housing 80 to the high pressure fluid inlets 62 of the hydraulic motors and to transfer the low-pressure hydraulic fluid from the low-pressure fluid outlets 64 of the hydraulic motors back to the cross housing, the fluid distribution means 50 further includes side housings. In the embodiment shown in FIG. 4, each motor has an associated side housing 100, 102, 104 and 106. However, it will be appreciated that a single side housing may be provided for more than one motor. Furthermore, side housings 100 and 104 are essentially identical to each other whilst side housings 102 and 106 are also essentially identical to each other. However, side housings 100, 104 are somewhat different to side housings 102, 106. In other embodiment, each of the side housings may be identical to each other. Furthermore, side housings 100, 102 may be formed as a single or integral unit. As an even further alternative embodiment, the fluid distribution means 50 shown in FIG. 4 may be formed as an integral unit, for example by casting or machining an appropriate housing block and forming the appropriate passages therein.

Figure 9:
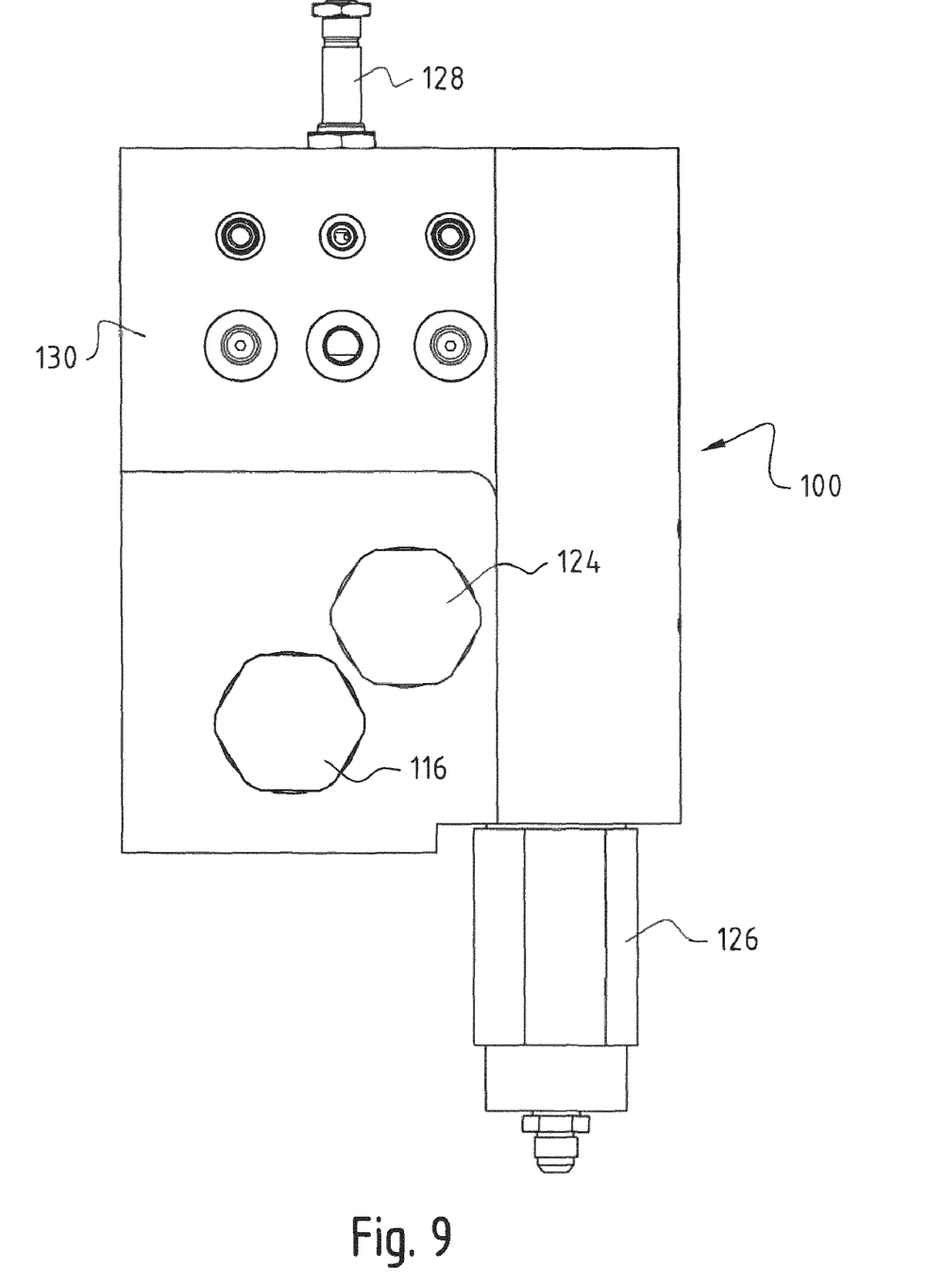
FIG. 9 is a front view of another of the side housings of the fluid distribution means used in the embodiment shown in FIGS. 1 to 5.

Turning now to FIGS. 4 and 9, side housing 100 includes an opening 110 that provides a high-pressure fluid inlet to the side housing 100. Opening 110 is connected via appropriate connectors 112 to the opening in the cross flow passage 87. In this manner, the high-pressure hydraulic fluid inlet of side housing 100 is placed in fluid communication with the cross flow passage 87 and the high-pressure fluid inlet 82 of the fluid distribution means 50. An appropriate vertically extending passage in side housing 100 extends down to a further cross passage in the side housing 100. The vertically extending passage is plugged by a plug 114. Vertically extending passage may be formed by drilling into the side housing 100. The further cross passage is drilled such that it intersects with the vertically extending passage. The inner side of this cross passage is positioned such that it comes into alignment with high pressure fluid inlet 62 of the hydraulic motor. A hollow bolt 116 having appropriate flow passages formed therein is used to join the cross passage of the side housing 100 to the high-pressure fluid inlet 62 of the hydraulic motor. The hollow bolt may comprise a hollow stem having appropriate fluid flow apertures formed in the hollow stem to place the hollow stem in fluid communication with the vertically extending passage. The hollow bolt 116 also acts to seal the outer end of the lower cross passage. In this manner, the high-pressure hydraulic fluid inlet 62 of the motor is placed in fluid communication with the high-pressure hydraulic fluid inlet 82 of the central housing 80.

The side housing 104 is similarly arranged to place the high-pressure hydraulic fluid inlet 62 of its respective associated hydraulic motor in fluid communication with the high-pressure fluid inlet 82 of the fluid distribution means 50.

Side housing 100 also includes appropriate fluid flow passages to place the low-pressure hydraulic fluid outlet 64 of the hydraulic motor associated with the side housing 100 into fluid communication with the low-pressure hydraulic fluid outlet 84 of the fluid distribution means 50. To this end, an appropriate upper cross passage is formed in the side housing 100 such that an opening 118 in the upper, inner side wall of the side housing 100 is formed. This opening forms a low-pressure hydraulic fluid outlet from the side housing 100. Appropriate connector 120 is used to sealingly connect opening 118 with the side opening formed by cross passage 93 in the cross housing 80. A vertically extending passage is formed in the side housing 100, for example, by drilling. The vertically extending passage connects with the passage extending inwardly from opening 118. The upper opening of the vertically extending passage is plugged with plug 122. A lower cross flow passage is formed, such as by drilling, in the lower part of the side housing 100. A hollow bolt 124 is used to connect the lower cross flow passage with the low-pressure hydraulic fluid outlet 64 of the hydraulic motor. The hollow bolt 124 also seals and closes the outer end of the lower cross flow passage.

In this manner, the low-pressure hydraulic fluid outlet 64 of the hydraulic motor is placed in fluid communication with the low-pressure hydraulic fluid outlet 84 of the fluid distribution means 50.

Side plate 104 is also arranged in a similar fashion to place the low-pressure hydraulic fluid outlet 64 of its respective associated motor into fluid communication with the low-pressure hydraulic fluid outlet 84 of the fluid distribution means 50.

The side housing 100 also includes a pressure release valve 126 that opens in the event that excess hydraulic pressure occurs in the side housing 100.

The side housing 100 is arranged such that it enables selective operation of its associated hydraulic motor to occur. To this end, the side housing 100 also includes a solenoid valve 128. Solenoid valve 128 spools open a passage in the side housing 100 that connects the high-pressure hydraulic fluid inlet of the motor to the low-pressure hydraulic fluid outlet of the motor. Hydraulic fluid can then flow between the inlet of the motor and the outlet of the motor to effectively bypass the motor and take the motor off line. The skilled person will readily appreciate that a number of different arrangements may be used to selectively place the hydraulic motor off-line and online. For example, a control valve may be placed in the cross flow passage 87 to interrupt the supply of high-pressure hydraulic fluid to the side housing 100. The side housing 100 also includes a plurality of pilot lines and control lines (referred to by reference numeral 130) to ensure that when the hydraulic motor is taken off-line, hydraulic fluid flow between the inlet and outlet of the motor occurs in the correct flow direction.

Side housing 102 will now be described in more detail with reference to FIG. 4 and FIG. 8. Side housing 102 includes an opening 132 in an upper inner side wall thereof. Opening 132 is formed by drilling a passage from the upper inner side wall into the side housing 102. Appropriate connectors 134 connect the opening 132 to the opening in the cross housing 80 that is formed by cross flow passage 88 in cross housing 80. The opening in cross flow passage 88 comprises a high-pressure hydraulic fluid outlet from the cross housing 80. The opening 132 in the side housing 102 comprises a high-pressure hydraulic fluid inlet to the side housing 102. A vertically extending passage is formed in the side housing 102 by drilling downwardly from the top wall of the side housing 102. This vertically extending passage connects with the fluid flow passage extending from upper inner wall opening 132. A plug 136 is used to close and seal the upper opening of the vertically extending passage. A further cross flow passage is formed in a lower part of the side housing 102. This lower cross flow passage is formed, for example, by drilling through the side housing 102 such that a lower inner opening is formed in the side housing 102. A hollow bolt 138 is then used to connect the high-pressure hydraulic fluid inlet 62 of the motor to the side housing 102. In this manner, the high-pressure hydraulic fluid inlet of the hydraulic motor associated with side housing 102 is placed in fluid communication with the high-pressure hydraulic fluid inlet 82 of the floor distribution means 50. Hollow bolt 138 also seals the outer opening of the lower cross flow passage.

The side housing 102 also includes a second upper inner opening 140 that is joined by appropriate connectors 142 to the opening in the crossflow passage 92 in the cross housing 80. The opening in the crossflow passage 92 constitutes a low pressure hydraulic fluid inlet for the cross housing and the opening 140 in the side housing 102 forms a low-pressure hydraulic fluid outlet from the side housing 102. A vertically extending passage is drilled into the side housing 102. This vertically extending passage is plugged and sealed by plug 144. A lower crossflow passage is formed in the side housing 102 and this lower crossflow passage intersects or connects with the lower end of the vertically extending passage. A hollow bolt 146 is used to connect the lower crossflow passage with the low-pressure hydraulic fluid outlet 64 of the respective hydraulic motor associated with the side housing 102. In this manner, the low-pressure hydraulic fluid outlet 64 of the hydraulic motor is placed in fluid communication with the low-pressure hydraulic fluid outlet 84 of the fluid distribution means 50. Hollow bolt 146 also seals the outer opening of the lower cross flow passage.

The side housing 102 also includes pressure relief valves 148, 150 that open in the event that excess hydraulic fluid pressure occurs.

Figure 8:
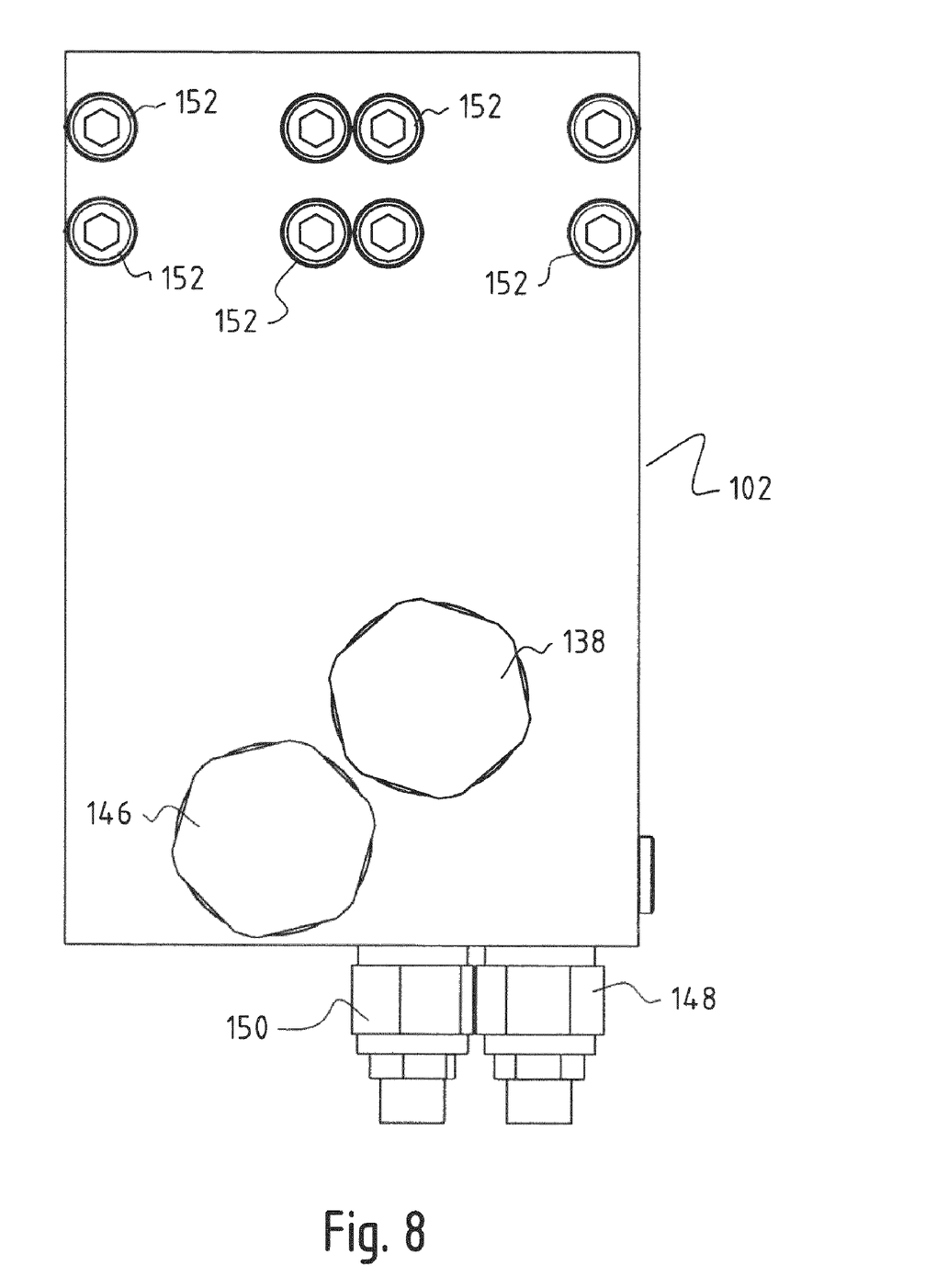
FIG. 8 is a front view of one of the side housings of the fluid distribution means used in the embodiment shown in FIGS. 1 to 5.

Also shown in FIG. 8 are bolts 152 (only some of which have been numbered in FIG. 8) that are used to hold split flange clamps that join the side housing to the central housing. The person skilled in the art will readily understand how such split flange clamps function and thus they need not be described further.

Side housing 106 is generally identical to side housing 102. Unlike side housings 100, 104, the side housings 102, 106 are not equipped with control valves and therefore the respective hydraulic motors associated with side housing is 102, 106 are always operating when hydraulic fluid is being supplied to the hydraulic fluid distribution means 50.

Figure 5:
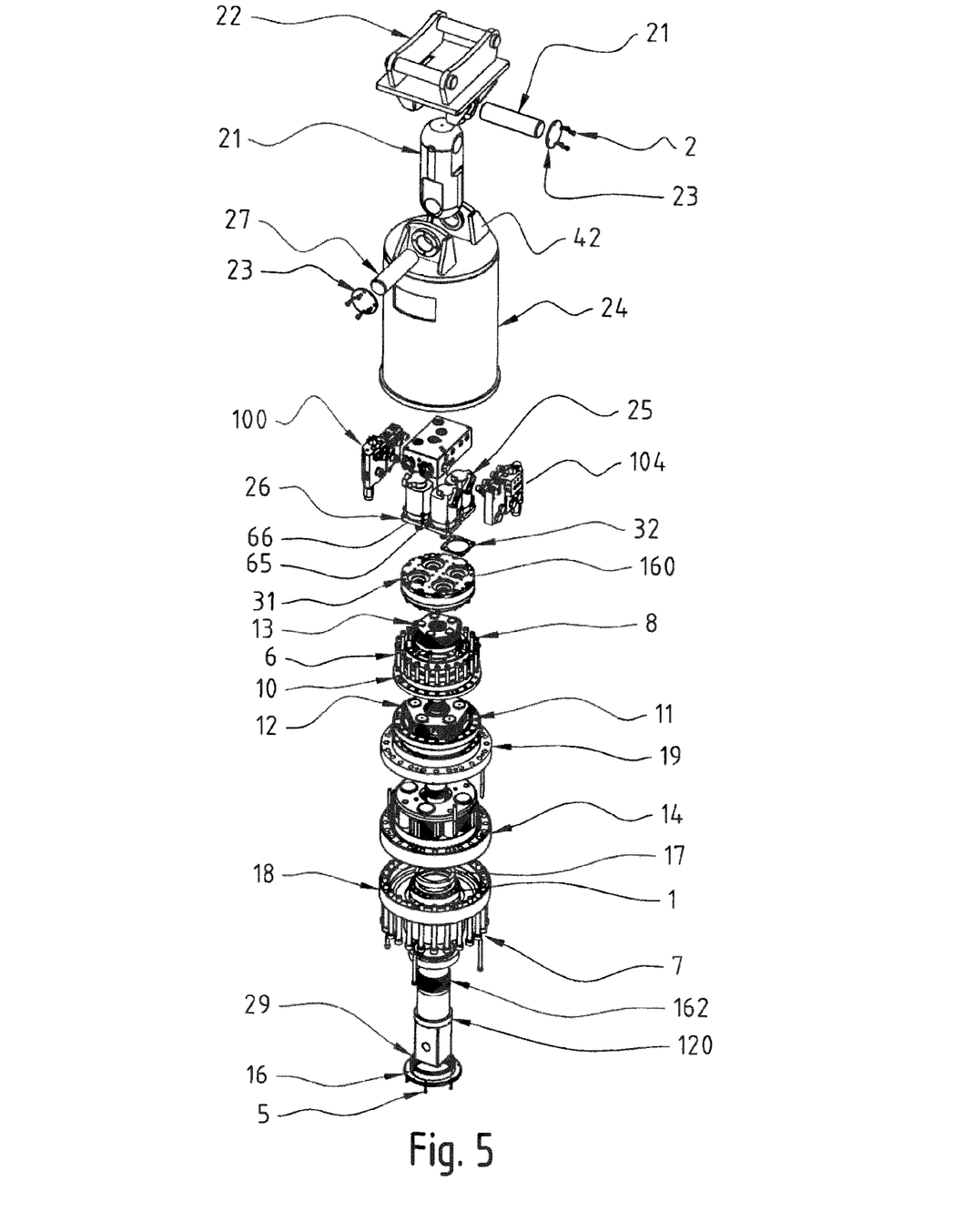
FIG. 5 shows a perspective view, apart and in line for assembly, of the drive unit shown in FIG. 1.

FIG. 5 shows the drive unit A apart and in line for assembly. The drive unit A includes an upper hitch assembly 22. A linkage pin 27 connects the opposed ears of upper hitch assembly 22 to a linkage pin 27. Linkage pin 27 is also inserted through an opening in linkage 20. Linkage 20 includes a lower opening that is placed into alignment with respective openings formed in opposed ears of upper bracket 42. A further linkage pin 27 is inserted through those openings to pivotally connect the linkage 21 to the hood assembly 24. Covers 23 that are held in place by bolts 2 cover the end of linkage pins 27.

The hood assembly 24 covers the fluid distribution means 50, hydraulic motors 60 and the gearbox unit 70. The hydraulic motors 25, 26 and the fluid distribution means 50, comprising the cross housing 80 and the side housings 100, 102, 104 and 106, are shown in FIG. 5.

As mentioned previously, each of the hydraulic motors is provided with a lower mounting plate 66 that is used to mount the motors to a splitter box assembly 31. A motor spacer 32 is used to ensure correct spacing between the motors and the splitter box assembly 31. The splitter box assembly 31 includes openings 160 through which the output shafts of the hydraulic motors 25, 26 extend. The output shafts of the hydraulic motors 25, 26 each carry a gear 65 and these gears 65 engage with the planetary gears of gear set 13. Gear set 13 is conventional and need not be described further. Gear set 13 is held in place on interim housing 10 by screw socket head cap 8 and bolts 6.

Interim housing 10 is itself bolted to lower interim housing 19. Lower interim housing 19 holds a gear set 12 that has a central sun gear that engages with the planetary gears of gear set 13. Therefore, rotation of planetary gears of gear set 13 causes rotation of the sun gear of the gear set 12. This in turn causes rotation of the planetary gears of gear set 12. The planetary gears of gear set 12 form a ring gear 11.

Interim housing 19 is bolted to ring gear 14. Ring gear 14 includes a similar sun gear and planetary gear arrangement as described above (and will be well-known to persons skilled in the art). Ring gear 14 is bolted to output housing 18. Output housing 18 includes a tapered roller bearings 1 (or other suitable bearing) and a locknut 17. Bolts 7 fitted with washes 30 are used to bolt the output housing 18 to the ring gear 14. The output shaft 20, which has a toothed or gear arrangement 162 formed thereon, is journalled in the bearing 1. The toothed or gear arrangement 162 formed on the output shaft 20 engages with the planetary gears of ring gear 14. Accordingly, rotation of the planetary gears of the ring gear 14 causes rotation of the output shaft 20. The output shaft 20 is sealed in place using a seal 29 that is covered by seal protector 16. Seal protector 16 is bolted in place using bolts 5.

The person skilled in the art will appreciate that the gearbox unit acts as a gear reduction drive to decrease the speed and increase the torque applied to the output shaft.

Figure 10:
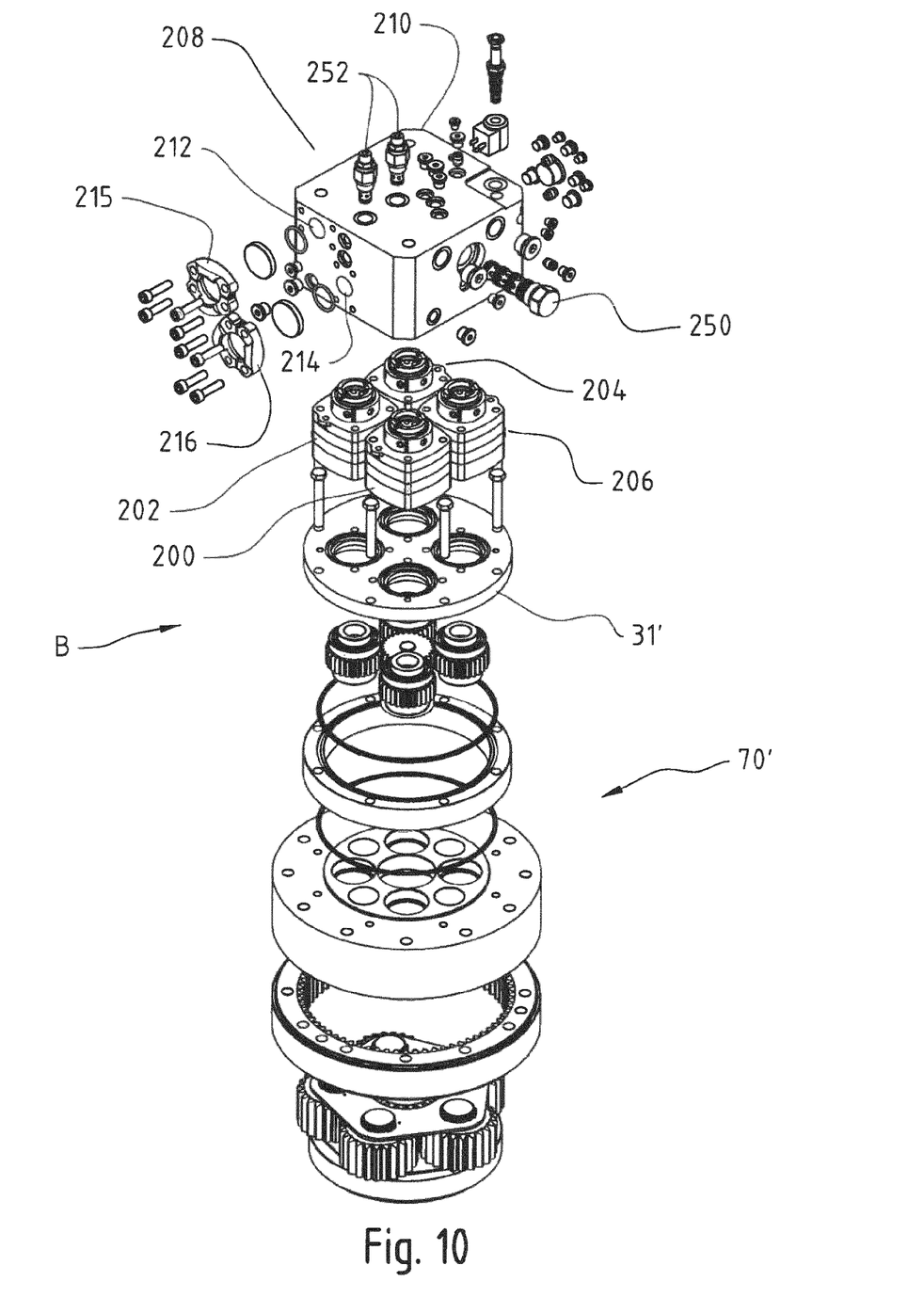
FIG. 10 shows a perspective view, apart and in line for assembly, of a drive unit in accordance with another embodiment of the present invention. In the embodiment shown in FIG. 10, the hydraulic motors have an end plate omitted therefrom.

FIG. 10 shows a perspective view, apart and in line for assembly, of a drive unit in accordance with another embodiment of the present invention. The drive unit B shown in FIG. 10 has a number of parts, including the hood assembly and the output shaft assembly, omitted therefrom for clarity. However, these features are essentially identical to the features as shown and described in FIGS. 1 and 5 and accordingly they need not be described further.

As can be seen in FIG. 10, the drive unit includes a splitter box assembly 31' and a gearbox unit 70'. The gearbox unit 70' is essentially identical to the gearbox unit 70 described in detail with reference to FIG. 5 and therefore it need not be described further.

The drive unit B shown in FIG. 10 includes 4 hydraulic motors 200, 202, 204, 206. Unlike the hydraulic motors shown in the embodiment described with reference to FIGS. 1 to 9, the hydraulic motors 200, 202, 204, 206 comprise a motor body housing a rotor (which might be in the form of a geroller set). However, the upper end plate (also known as a top housing or valve housing) has been omitted or removed from the hydraulic motors. This has been made possible because the fluid distribution means 208 is arranged such that it replaces the upper end plates of the hydraulic motors.

Figures 11, 12, 13, 14, 16:
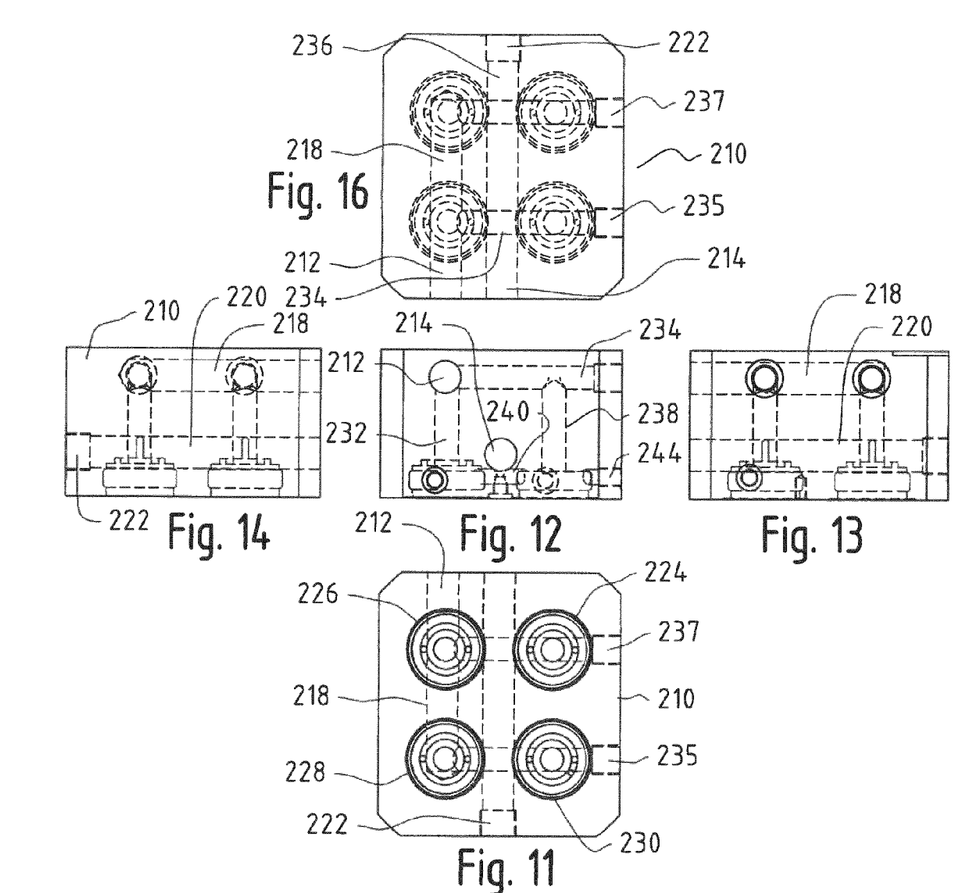
Figure 15:
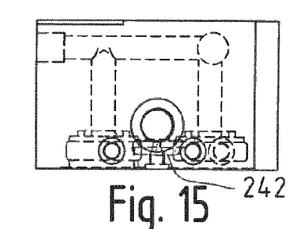
FIG. 15 shows a rear view of the fluid distribution means shown in FIG. 10; and f

FIG. 11 shows an underneath view of the fluid distribution means 208 of the drive unit shown in FIG. 10. FIG. 12 shows a front view of the fluid distribution means 208 and FIG. 13 shows a side view of the fluid distribution means 208. FIG. 14 shows a view from the other side of the fluid distribution means, FIG. 15 shows a rear view of the fluid distribution means 208 and FIG. 16 shows a top view of the fluid distribution means 208. In FIGS. 11 to 16, hidden detail of the internal structure of the fluid distribution means 208 is shown in dotted outline.

The fluid distribution means 208 comprises a housing 210. Housing 210 may be formed from a solid piece of metal. Appropriate flow passages and openings may subsequently be drilled in the housing. This embodiment will be described with reference to FIGS. 11 to 16. However, it will also be appreciated that the housing 210 may be formed by casting The housing 210 includes an inlet 212 and an outlet 214 (best shown in FIG. 12). Appropriate hydraulic connectors 215, 216 are mounted to respective inlet 212 and outlet 214 by use of bolts 217 (see FIG. 10) in order to enable appropriate hydraulic lines to be connected to the inlet and outlet. As the best shown in FIGS. 11 and 16, a passage 218 is drilled into the housing 210 so that it extends inwardly from the inlet 212. Passage 218 provides a flow passage for high-pressure hydraulic fluid from the inlet into the housing. Similarly, a passage 220 is drilled into the housing 210 from outlet 214. Passage 220 provides a flow passage for removing relatively low-pressure hydraulic fluid from the housing 210. Passage 220, as shown in FIGS. 11 and 16, extends across the entire width of the housing 210. A plug 222 may be used to close at one end of the passage 220. Alternatively, the plug 222 may be replaced by a further hydraulic connector to enable another outlet hydraulic line to be connected thereto.

The housing 210 is designed to mate with the upper end of the hydraulic motor bodies. To this end, the housing 210 includes openings 224, 226, 228 and 230. These openings are sized and shaped so that they sealingly fit onto the upper end of the bodies of the hydraulic motors 202, 204, 206 (see FIG. 10). Appropriate bolts, clamps or similar fasteners will be used to fix the housing 210 to the bodies of the hydraulic motors 202, 204, 206. The openings 224, 226, 228 and 230 are provided with appropriate seals to ensure a fluid tight seal between the openings and the bodies of the hydraulic motors is obtained.

In order to provide high pressure hydraulic fluid from the inlet 212 to the openings 224, 226, 228, 230, passages are drilled into the housing 210 so that they extend upwardly from the openings 224, 226, 228 and 230 to the high pressure hydraulic fluid passage 218. One such passage is shown at 232 in FIG. 12. Cross passages 234 and 236 are drilled in from the side of housing 210 and intersect with the high pressure hydraulic fluid passage 218. Further passages (one of which is shown at 238 in FIG. 12) are drilled upwardly from openings 224, 230 and intersect with respective cross passages 234, 236 to thereby provide high pressure hydraulic fluid to the openings 224, 230. Plugs 235, 237 are used to close the ends of respective passages 234, 236.

In order to remove lower pressure hydraulic fluid from the hydraulic motor bodies, the outlets of the hydraulic motor bodies are placed into contact with cross passages 240, 242 (see FIGS. 12 and 15). These cross passages intersect with passage 220 and provide a flow path from respective pairs of openings 224, 226 and 228, 230 to the outlet flow passage 220. It will be appreciated that cross passages 240, 242 extend from a position on the respective openings 224, 226, 228 and 230 such that only outlet hydraulic fluid flows into cross passages 240, 242. Plugs, one of which is shown at 244 in FIG. 12, may be used to close an outer end of the drilling used to form the cross passages 240, 242.

Fluid distribution means 208 may also include a cartridge valve 250 to prevent hydraulic shock and flow control valves 252 to selectively control the flow of hydraulic fluid to one or more of the hydraulic motors.

The embodiment shown in FIGS. 10 to 16 is especially useful in that a compact drive unit can be obtained at a potentially lower manufactured cost, as it is not necessary to source one end plate for the hydraulic motors.

The drive unit of the present invention provides a drive unit that can supply high torque and large output whilst avoiding the need to incorporate large and expensive hydraulic motors. The drive unit incorporates multiple hydraulic motors that are used to drive, either directly or indirectly (and most typically via a gearbox arrangement), an output shaft. The drive unit can be arranged such that only a single high-pressure hydraulic fluid connection to the drive unit needs to be made, despite the fact that a plurality of hydraulic motors, each of which require a supply of high-pressure hydraulic fluid to drive those motors, are incorporated into the drive unit. Similarly, the drive unit may have only a single hydraulic fluid outlet, although it will be appreciated that the embodiment shown in FIGS. 1 to 9 may include 2 hydraulic fluid outlets. Therefore, the requirement for connecting hydraulic fluid lines to the drive unit is minimised, which lowers setup costs, and maintenance costs. The drive unit is provided with its own fluid distribution system that can provide appropriate flows of high-pressure fluid to the hydraulic motors and appropriate flows of low pressure hydraulic fluid from the hydraulic motors. The drive unit is compact and reliable. In some embodiments, one or more of the hydraulic motors may be selectively operated to thereby provide for variable speed operation or variable torque operation. Appropriate control valves may be provided in the fluid distribution means to selectively operate (by turning off or turning on) one or more of the hydraulic motors. In embodiment where the fluid distribution means he is designed to enable the hydraulic motors to be provided without upper end plates, the drive unit can be especially compact.

Those skilled in the art will appreciate that the present invention may be susceptible to variations and modifications other than those specifically described. It will be understood the present invention encompasses all such variations and modifications that fall within its spirit and scope.

The invention claimed is:
1. A drive unit comprising
an output shaft
two or more hydraulic motors, each hydraulic motor being adapted to drive the output shaft, and
hydraulic fluid distribution means for supplying relatively high pressure hydraulic fluid to the drive motors and for removing relatively low pressure hydraulic fluid from the drive motors,
wherein the hydraulic fluid distribution means comprises a housing having a high-pressure hydraulic fluid inlet for connection to a source of high-pressure hydraulic fluid, a low pressure hydraulic fluid outlet for connection to a hydraulic fluid outlet line, two or more high pressure hydraulic fluid outlets for connection to respective high-pressure hydraulic fluid inlets of the two or more hydraulic motors and two or more low pressure hydraulic fluid inlets for connection to respective low-pressure hydraulic fluid outlets of the two or more hydraulic motors, and wherein the housing comprises a cross housing part having a high-pressure hydraulic fluid inlet for connection to a source of high-pressure hydraulic fluid and a low-pressure hydraulic fluid outlet for removing low-pressure hydraulic fluid that has passed through the motors from the housing, a first side housing part connected to the cross housing part, the first side housing part including at least one high-pressure hydraulic fluid outlet for connection to respective high-pressure hydraulic fluid inlets of one or more hydraulic motors and at least one low-pressure hydraulic fluid inlet for connection to respective low-pressure hydraulic fluid outlets of the one or more hydraulic motors, and a second side housing part connected to the cross housing part, the second side housing part including at least one high-pressure hydraulic fluid outlet for connection to respective high-pressure hydraulic fluid inlets of one or more hydraulic motors and at least one low-pressure hydraulic fluid inlet for connection to respective low-pressure hydraulic fluid outlets of the one or more hydraulic motors, the cross housing part including a high pressure hydraulic fluid flow path for passing high-pressure hydraulic fluid from the high-pressure hydraulic fluid inlet to the first side housing part and to the second side housing part, the cross part including a low pressure hydraulic flow path for receiving low-pressure hydraulic fluid from the first side housing part and the second side housing part.

2. A drive unit as claimed in claim 1 wherein the first side housing part and the second side housing part include a high-pressure fluid flow path for receiving high-pressure hydraulic fluid from the cross housing part and for transferring high-pressure hydraulic fluid to the high-pressure hydraulic fluid outlets and wherein the first side housing part and the second side housing part also include a low-pressure hydraulic fluid flow path for receiving low-pressure hydraulic fluid from the low pressure hydraulic fluid inlets and for transferring low-pressure hydraulic fluid to the cross housing part.

3. A drive unit as claimed in claim 1 wherein each hydraulic motor is associated with a selected one of said side housing parts.

4. A drive unit as claimed in claim 1 wherein the fluid distribution means has only a single high pressure inlet.

5. A drive unit comprising:
an output shaft
two or more hydraulic motors, each hydraulic motor being adapted to drive the output shaft, and
hydraulic fluid distribution means for supplying relatively high pressure hydraulic fluid to the drive motors and for removing relatively low pressure hydraulic fluid from the drive motors,
the hydraulic fluid distribution means comprises a hydraulic fluid inlet for connecting to a hydraulic line to provide relatively high pressure hydraulic fluid to the two or more hydraulic motors and a hydraulic fluid outlet for removing relatively low pressure hydraulic fluid from the two or more hydraulic motors and
wherein the hydraulic motors comprise a motor body housing a rotor and the fluid distribution means provide high-pressure hydraulic fluid directly to the motor body without passing through a motor end plate and the fluid distribution means removes low-pressure hydraulic fluid from the motor body without passing through a motor end plate.

6. A drive unit as claimed in claim 5 wherein the hydraulic fluid distribution means further comprises valving to selectively turn off or turn on one or more of the hydraulic motors.

7. A drive unit as claimed in claim 6 wherein the valving selectively controls flow of hydraulic fluid to one or more of the hydraulic motors.

8. A drive unit as claimed in claim 6 wherein the valving comprises at least one control valve cause hydraulic fluid to loop or circulate between the motor inlet and the motor outlet to thereby reduce or stop the flow of hydraulic fluid to the motor.

9. A drive unit comprising:
an output shaft
two or more hydraulic motors, each hydraulic motor being adapted to drive the output shaft, and
hydraulic fluid distribution means for supplying relatively high pressure hydraulic fluid to the drive motors and for removing relatively low pressure hydraulic fluid from the drive motors,
wherein the hydraulic fluid distribution means comprises a hydraulic fluid inlet for connecting to a hydraulic line to provide relatively high pressure hydraulic fluid to the two or more hydraulic motors and a hydraulic fluid outlet for removing relatively low pressure hydraulic fluid from the two or more hydraulic motors, and
wherein the output shaft of each hydraulic motor drives a first planetary gear set and the first planetary gear set, in turn, drives a central sun gear which, in turn, drives a second planetary gear set and the second planetary gear set drives the output shaft of the drive unit or one or more further gear sets are provided between the second planetary gear set and the drive unit output shaft.

10. A drive unit as claimed in claim 1 wherein the drive unit further comprises mounting means for mounting the drive unit to an arm.

11. A drive unit as claimed in claim 5 wherein the hydraulic fluid distribution means comprises a housing having a hydraulic fluid inlet for connecting to a hydraulic line to provide relatively high pressure hydraulic fluid to the two or more hydraulic motors and a hydraulic fluid outlet for removing relatively low pressure hydraulic fluid from the two or more hydraulic motors, the housing having tow or more high pressure fluid outlets to provide relatively high pressure hydraulic fluid to the two or more hydraulic motors, the housing having tow or more low pressure hydraulic fluid inlets for receiving relatively low pressure hydraulic pressure fluid from the two or more hydraulic motors.

12. A drive unit as claimed in claim 1 wherein the hydraulic fluid distribution means further comprises valving to selectively turn off or turn on one or more of the hydraulic motors.

13. A drive unit as claimed in claim 12 wherein the valving selectively controls flow of hydraulic fluid to one or more of the hydraulic motors.

14. A drive unit as claimed in claim 12 wherein the valving comprises at least one control valve to cause hydraulic fluid to loop or circulate between the motor inlet and the motor outlet to thereby reduce or stop the flow of hydraulic fluid to the motor.

15. A drive unit as claimed in claim 5 wherein the fluid distribution means has only a single high pressure inlet.

* * * * *